(12) United States Patent
Dascălu et al.

(10) Patent No.: US 9,734,144 B2
(45) Date of Patent: Aug. 15, 2017

(54) THREE-DIMENSIONAL LATENT SEMANTIC ANALYSIS

(71) Applicants: Mihai Dascălu, Bucharest (RO); David Walter Ash, Bellevue, WA (US)

(72) Inventors: Mihai Dascălu, Bucharest (RO); David Walter Ash, Bellevue, WA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 14/891,810

(22) PCT Filed: Sep. 18, 2014

(86) PCT No.: PCT/RO2014/000024
§ 371 (c)(1),
(2) Date: Nov. 17, 2015

(87) PCT Pub. No.: WO2016/043609
PCT Pub. Date: Mar. 24, 2016

(65) Prior Publication Data
US 2016/0283467 A1  Sep. 29, 2016

(51) Int. Cl.
*G06F 17/27* (2006.01)
*G06F 17/30* (2006.01)

(52) U.S. Cl.
CPC .... *G06F 17/2785* (2013.01); *G06F 17/30106* (2013.01)

(58) Field of Classification Search
CPC ...... G06F 17/27; G06F 17/20; G06F 17/2705; G06F 17/271; G06F 17/2715; G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/2795
USPC .................................. 704/1, 9, 10
See application file for complete search history.

(56) References Cited

U.S. PATENT DOCUMENTS

| | | | |
|---|---|---|---|
| 4,839,853 A | 6/1989 | Deerwester et al. | |
| 5,398,199 A * | 3/1995 | Lefons .............. | G06F 17/30542 708/446 |
| 5,440,481 A * | 8/1995 | Kostoff .............. | G06F 17/2715 |
| 6,314,419 B1 | 11/2001 | Faisal | |
| 6,353,827 B1 * | 3/2002 | Davies .............. | G06F 17/30616 707/769 |

(Continued)

FOREIGN PATENT DOCUMENTS

JP    2010128677 A    6/2010

OTHER PUBLICATIONS

Saad et al., Lanczos Vectors versus Singular Vectors for Effective Dimension Reduction, 2008, IEEE Transactions on Knowledge and Data Engineering, vol. 21, Issue 8, pp. 1091-1103.*

(Continued)

*Primary Examiner* — Lamont Spooner
(74) *Attorney, Agent, or Firm* — Brundidge & Stanger, P.C.

(57) ABSTRACT

In some examples, a computing system may access multiple information files, generate term-passage matrix data based on the multiple information files, and decompose the term-passage matrix data to generate a reduced-dimensional semantic space, which may be used for information retrieval.

16 Claims, 5 Drawing Sheets

(56) References Cited

U.S. PATENT DOCUMENTS

| | | | |
|---|---|---|---|
| 6,510,406 B1* | 1/2003 | Marchisio | G06F 17/2715 704/9 |
| 6,711,563 B1* | 3/2004 | Koskas | G06F 17/30324 707/600 |
| 7,013,308 B1* | 3/2006 | Tunstall-Pedoe | G06F 17/30654 707/709 |
| 7,483,892 B1 | 1/2009 | Sommer et al. | |
| 7,587,381 B1* | 9/2009 | Remy | G06F 17/30616 |
| 7,630,992 B2* | 12/2009 | Martin | G06F 17/30613 |
| 7,739,102 B2 | 6/2010 | Bender | |
| 7,917,496 B2 | 3/2011 | King | |
| 8,255,401 B2* | 8/2012 | Clarkson | G06F 17/16 707/737 |
| 8,612,369 B2 | 12/2013 | Chen et al. | |
| 9,201,876 B1* | 12/2015 | Kumar | G06F 17/30 |
| 2002/0062302 A1* | 5/2002 | Oosta | G06F 17/30713 |
| 2002/0095397 A1* | 7/2002 | Koskas | G06F 17/30324 |
| 2002/0095421 A1* | 7/2002 | Koskas | G06F 17/30595 |
| 2002/0156763 A1* | 10/2002 | Marchisio | G06F 17/241 |
| 2004/0064438 A1* | 4/2004 | Kostoff | G06F 17/30705 |
| 2005/0149494 A1* | 7/2005 | Lindh | G06F 17/30607 |
| 2005/0177558 A1* | 8/2005 | Dixon | G06F 17/30507 |
| 2005/0187905 A1* | 8/2005 | Dixon | G06F 17/30507 |
| 2005/0267871 A1* | 12/2005 | Marchisio | G06F 17/30672 |
| 2006/0200431 A1* | 9/2006 | Dwork | G06F 17/30539 706/12 |
| 2006/0259475 A1* | 11/2006 | Dehlinger | G06F 17/30997 |
| 2007/0156669 A1* | 7/2007 | Marchisio | G06F 17/30731 |
| 2008/0052268 A1* | 2/2008 | Koudas | G06F 17/30469 |
| 2009/0177463 A1* | 7/2009 | Gallagher | G06F 17/30616 704/10 |
| 2009/0319503 A1* | 12/2009 | Mehul | H04W 4/02 |
| 2010/0057704 A1* | 3/2010 | Duffie | G06F 11/2268 707/E17.062 |
| 2010/0082643 A1 | 4/2010 | Martin et al. | |
| 2010/0100543 A1* | 4/2010 | Brady | G06F 17/30613 707/732 |
| 2010/0159438 A1* | 6/2010 | German | G06F 17/30525 434/433 |
| 2010/0185685 A1 | 7/2010 | Chew et al. | |
| 2010/0185716 A1* | 7/2010 | Nakamura | G06F 17/16 708/650 |
| 2011/0016118 A1 | 1/2011 | Edala et al. | |
| 2011/0072051 A1 | 3/2011 | Lyne et al. | |
| 2011/0258196 A1* | 10/2011 | Lepsoy | G06F 17/3069 707/741 |
| 2011/0289081 A1* | 11/2011 | Willits | G06F 17/3043 707/728 |
| 2011/0302162 A1 | 12/2011 | Xiao et al. | |
| 2011/0317923 A1* | 12/2011 | Hondo | G06F 17/30247 382/190 |
| 2012/0084282 A1* | 4/2012 | Chiang | G06F 17/30864 707/725 |
| 2012/0102018 A1* | 4/2012 | Yang | G06F 17/3069 707/709 |
| 2012/0109651 A1* | 5/2012 | Chen | G06F 17/30616 704/240 |
| 2012/0297253 A1* | 11/2012 | Barajas | G06F 11/0727 714/42 |
| 2013/0013612 A1* | 1/2013 | Fittges | G06F 17/30707 707/739 |
| 2013/0124488 A1* | 5/2013 | Kang | G06F 17/30958 707/693 |
| 2013/0197900 A1 | 8/2013 | Rotbart et al. | |
| 2013/0304469 A1* | 11/2013 | Kamada | G06F 17/30864 704/239 |
| 2014/0163953 A1* | 6/2014 | Parikh | G06F 17/276 704/9 |
| 2015/0243276 A1* | 8/2015 | Cooper | G06F 17/30787 704/251 |

OTHER PUBLICATIONS

Cormen, T. H., et al., "Introduction to Algorithms," Third Edition, The MIT Press, pp. 1-43 (2009).

Foltz, P.W., et al., "Discourse coherence and LSA," Handbook of Latent Semantic Analysis, Lawrence Erlbaum, New York, pp. 167-184 (2007).

Foltz, P.W., et al., "The measurement of textual coherence with latent semantic analysis," Discourse Processes, vol. 25, Issue 2-3, pp. 1-32 (Jan. 1, 1998).

Golub, G.H., and Kahan, W., "Calculating the Singular Values and Pseudo-Inverse of a Matrix," Journal of the Society for Industrial and Applied Mathematics Series B Numerical Analysis, vol. 2, Issue 2, p. 205-224 (1965).

Güran, A., and Bayazit, N. G., "A New Preprocessing Phase for LSA-Based Turkish Text Summarization," Recent Advances in Computer Science and Information Engineering, vol. 124, pp. 305-310 (2012).

International Search Report and Written Opinion of International Application No. PCT/RO 2014/000024, mailed on Sep. 10, 2015.

Krcmár, L., et al., "Exploration of Semantic Spaces Obtained from Czech Corpora," DATESO, pp. 97-107 (2011).

Landauer, T. k., and Dumais, S. T., "A Solution to Plato's Problem: The Latent Semantic Analysis Theory of Acquisition, Induction, and Representation of Knowledge," Psychological Review, vol. 104, No. 2, pp. 211-240 (1997).

Landauer, T. K., et al., "An introduction to latent semantic analysis," Discourse processes, vol. 25, Issue 2-3, pp. 259-284 (Jan. 1, 1998).

Marneffe, M-C., et al., "Generating Typed Dependency Parses from Phrase Structure Parses," In Proc. Int'l Conf. on Language Resources and Evaluation (LREC), pp. 449-454 (2006).

Mohammad, S., and Hirst, G., "Measuring Semantic Distance using Distributional Profiles of Concepts," Association for Computational Linguistics, vol. 1, No. 1, pp. 1-34 (2006).

Wang, X., et al., "Latent Semantic Analysis for Multiple-Type Interrelated Data Objects," SIGIR'06, pp. 236-243 (Aug. 6-11, 2006).

* cited by examiner

THREE-DIMENSIONAL LATENT SEMANTIC ANALYSIS

CROSS-REFERENCE TO RELATED APPLICATION

This Application is the U.S. National Stage filing under 35 U.S.C. §371 of International Application Ser. No. PCT/RO2014/000024, filed on Sep. 18, 2014. The disclosure of the International Application is hereby incorporated herein by reference in its entirety.

TECHNICAL FIELD

The embodiments described herein pertain generally to information analysis and, more particularly, to computer-based semantic analysis.

BACKGROUND

Unless otherwise indicated herein, the approaches described in this section are not prior art to the claims in this application and are not admitted to be prior art by inclusion in this section.

Semantic analysis is a process of relating syntactic structures of a document (e.g., phrases, paragraphs, the document, etc.) to language-independent meanings. Semantic analysis may be performed using various methods such as latent semantic analysis (LSA). LSA is a theory and method for extracting and representing contextual-usage meanings of words by statistical computations applied to a corpus of texts. In general, LSA assumes that the aggregate of all the word contexts provides a set of mutual constraints that largely determines meaning of words and sets of words. While LSA has been used in many studies (e.g., data clustering, document classification, etc.), LSA has some limitations in certain areas (e.g., cognitive abilities, analysis on information expressed by syntax, etc.).

SUMMARY

In one example embodiment, a method may include: accessing, by one or more processors, multiple information files; generating, by the one or more processors, a term-passage matrix data based on the multiple information files; and decomposing the term-passage matrix data to generate a reduced-dimensional semantic space.

In another embodiment, a non-transitory computer-readable medium, hosted on a computing device/system, may store one or more executable instructions that, when executed, cause one or more processors to generate term-passage matrix data to represent multiple information files; and decompose the term-passage matrix data to generate a reduced-dimensional semantic space.

In yet another example embodiment, an apparatus may include an information accessing module configured to access multiple information files, and a latent semantic analysis (LSA) module configured to generate term-passage matrix data based on the multiple information files, and generate a reduced-dimensional semantic space based on the term-passage matrix data.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

Embodiments of the present disclosure relate to latent semantic analysis (LSA). In LSA, the meaning of each passage of words may be considered to be the sum of the meanings of the individual words, resulting in a very large number of simultaneous linear equations. These equations may be derived by starting with a matrix representing the frequency of individual words in individual passages. This matrix may be decomposed using a standard linear algebra approach known as singular value decomposition (SVD), which provides a set of linear equations. The SVD may be accomplished using a Lanczos algorithm that solves the eigenvalues associated with the set of linear equations. In some embodiments, a "term" from the decomposed matrix may include, for example, an individual/single word, a compound word (e.g., "Intellectual Property") that may be considered as a single word, a word pair, and/or a textual fragment or constituent of more than two words. The textual fragment or constituent may be coherent by themselves and semantically relevant. In some instances, the term may include advanced discourse structures such as rhetorical schemas, discourse specific markers and/or specific discourse annotations.

Under conventional techniques, LSA deals with individual words and ignores word pairs, while the words pairs may represent the context in a more meaningful way. In addition, an initial representation of LSA uses a bag-of-words model and therefore word orders are irrelevant for LSA. Semantically related word pairs may provide a possibility to partially reconstruct the initial context. However, if all possible pairs of words are included for decomposition associated with LSA, the decomposition would become computationally intractable.

Embodiments of the present disclosure treat pairs of words as additional individual words for computational purposes, and include n word pairs (e.g., common word pairs), where n may be represented as an increasing sequence. In some embodiments, the increasing sequence may include $1, 2_1, 2^2, 2^3, \ldots, 2^i, \ldots$. In some embodiments, a Lanczos algorithm may be applied using each value of n in turn. Once the algorithm produces a set of eigenvalues that includes, to some extent, a previous set of eigenvalues, the algorithm may assume that further word pairs do not add more significantly relevant semantic meanings. Then, the representation of word pairs within the corresponding vector spaces may converge, and the algorithm may stop. Embodiments of the present disclosure enrich context of representation and significance of underlying semantic relationships via word pairs, while maintaining computational tractability of LSA.

Figure 1:
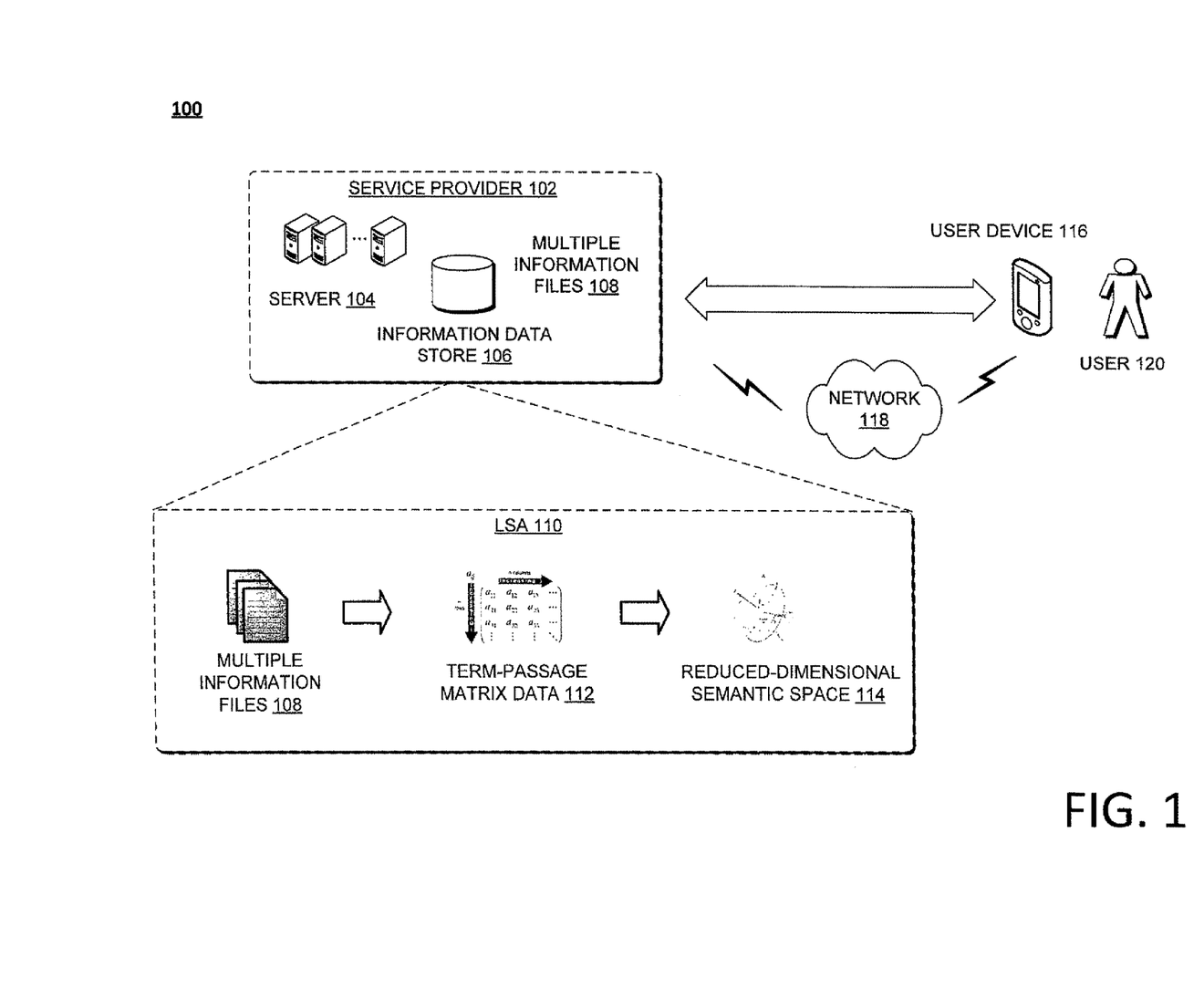
FIG. 1 shows an example environment in which latent semantic analysis (LSA) may be implemented, arranged in accordance with at least some embodiments described herein.

FIG. 1 shows an example environment 100 in which LSA may be implemented, arranged in accordance with at least some embodiments described herein. Environment 100 includes a service provider 102, which may provide a service related to information analysis. The service may refer to a set of related hardware/software functionalities that may be used for various purposes, together with policies, that perform the information analysis. At least one portion of the service may be implemented by a server 104, which may include a server or a collection of servers in a distributed configuration (e.g., cloud computing service, server farm, etc.) or non-distributed configuration. For example, server 104 may access multiple information files 108 stored in information data store 106, and perform LSA 110 based on multiple information files 108.

In some embodiments, server 104 may generate term-passage matrix data 112 based on multiple information files 108. In these instances, term-passage matrix data 112 may include a collection of text, wherein rows stand for individual words, columns stand for passages (e.g., a paragraph, a chapter, a section, an information file of multiple information files 108, etc.), and individual cell entries contain the frequency with which each word occurs in the passage. For example, the text collection of multiple information files 108 may be first divided into passages with coherent meanings, and then the collection may be represented as a term-passage matrix (e.g., term-passage matrix data 112). In some instances, a word may have more than one possible meaning, and context related to the word may be used to determine intended senses. For example, "train" can mean both "public transport" and "undergo training"; however, train in the passage including "gym" may refer to "undergo training."

In some embodiments, a number of rows of the term-passage matrix data 112 may include a sum of a number of distinct words in multiple information files 108 and a number of distinct word pairs in multiple information files 108. In these instances, a number of columns of term-passage matrix data 112 may include a number of passages in multiple information files 108.

In some embodiments, a word pair may include a pair of two words that appears in a passage. In these instances, the word pair may be a consecutive word pair or a non-consecutive word pair. A consecutive pair may include a pair of words that appear consecutively in the passage, and/or the combination of words may be considered effectively a single word. For example, a name of a property, e.g. "Intellectual Property" is effectively a single word and there would be little semantic value in analyzing the two words "Intellectual" and "Property" separately when they appear together as the name of the property. A non-consecutive pair may include a pair of words that do not automatically belong together, and/or a pair of words whose appearance together has some semantic meanings. For example, the word "train" has more than one meaning: it may refer to working out or refer to a form of transportation that runs on rails. If the word "gym" appears nearby, then it is likely that the former meaning of "train" (i.e., working out) applies and not the latter. This does not mean that "gym" and "train" together may be considered as one word; rather this means that the word "gym" imparts a semantic meaning to the word "train."

In some embodiments, after generating term-passage matrix data 112, server 104 may decompose term-passage matrix data 112 to generate a reduced-dimensional semantic space 114, which may include a mathematical representation of a collection of text of multiple information files 108. In these instances, individual words, passages, and/or word combinations may have a dimensional vector representation in a semantic space. In some embodiments, comparison of any given two words may be represented by a comparison between the cosine of the angle between two vectors representing the words within the semantic space.

In some embodiments, a semantic distance of an individual word pair of the distinct word pairs may be selected based on a predetermined condition associated with computational complexity of decomposing term-passage matrix data 112. In these instances, semantic distance may be represented by semantic similarity and/or semantic relatedness. For example, a semantic distance may include a measure of how close or distant, in terms of meanings, two units (e.g., words, phrases, sentences, paragraphs, or multiple information files 108) of a language are.

Server 104 may also communicate with a user device 116 via a network 118. User device 116 may include a mobile or desktop computer, a personal data assistant (PDA), an internet appliance, an internet enabled mobile phone, a server or any other computing device configured with a network connection. Network 118 may include wired and/or wireless networks that enable communications between the various computing devices described in environment 100. In some embodiments, network 118 may include local area networks (LANs), wide area networks (WAN), mobile telephone networks (MTNs), and other types of networks, possibly used in conjunction with one another, to facilitate communication between the various computing devices (e.g., user device 116 and server 104).

In some embodiments, via network 118, server 104 may receive a query including a word from user device 116. The server 104 may then determine a pseudo object associated with the query in reduced-dimensional semantic space 114, and examine one or more similarities between the pseudo object and words in multiple information files 108 in reduced-dimensional semantic space 114. Then, server 104 may determine a passage from multiple information files 108 based on the one or more similarities, and at least cause the passage to be presented at user device 116 to a user 120.

Figure 2:
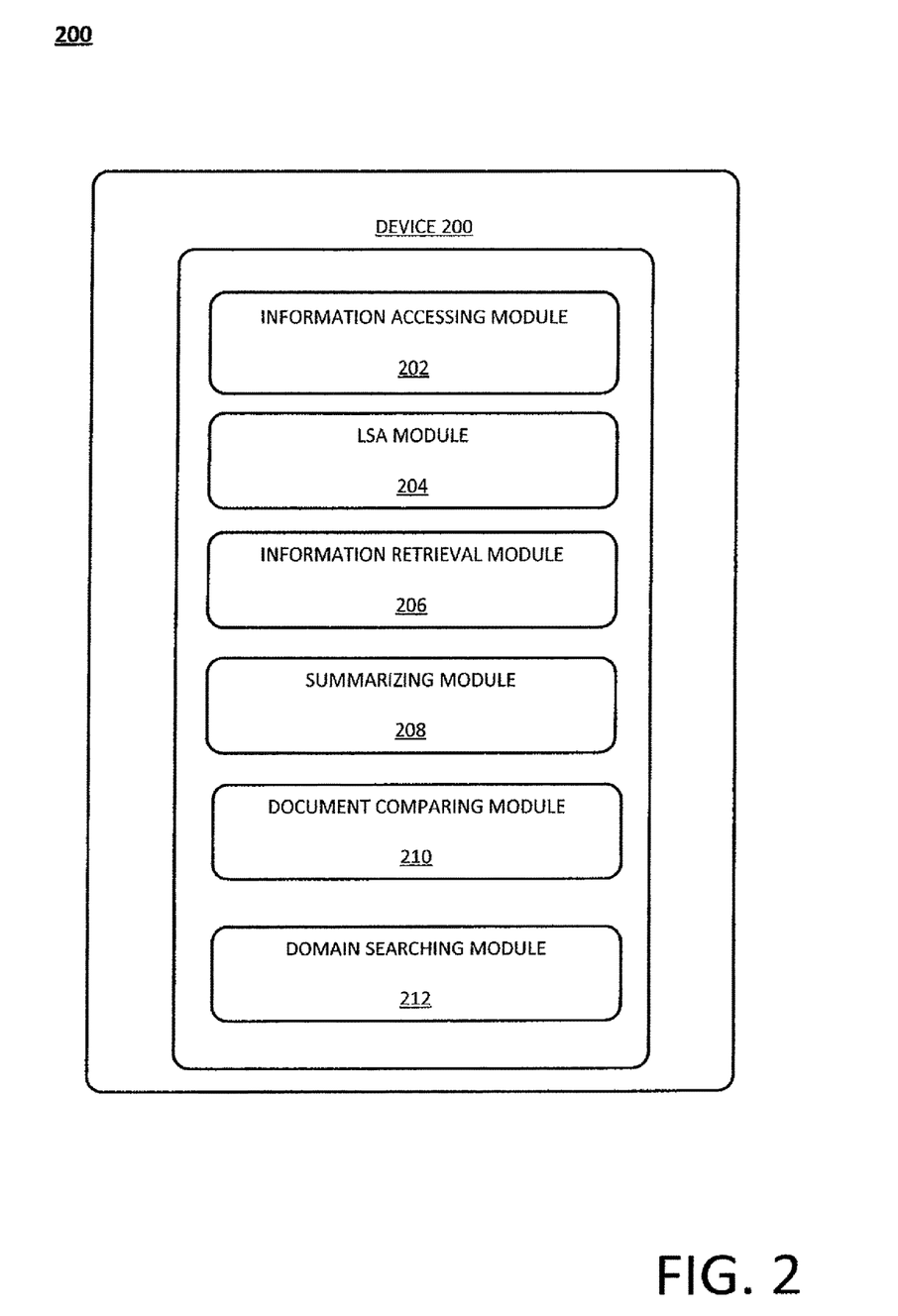
FIG. 2 shows an example configuration of a device with which at least portions of LSA may be implemented, arranged in accordance with at least some embodiments described herein.

FIG. 2 shows an example configuration of a device 200 with which at least portions of LSA may be implemented, arranged in accordance with at least some embodiments described herein. Device 200 may refer to at least one portion of server 104. As depicted, device 200 may be configured to include various components such as, an information accessing module 202, a LSA module 204, an information retrieval module 206, a summarizing module 208, a document comparing module 210, a domain searching module 212, etc.

Information accessing module 202 may refer to one or more components configured, designed, and/or programmed to access multiple information files 108 stored in information data store 106. For example, multiple information files 108 may include a written or drawn representation such as, a document, a multimedia presentation, a slide presentation, etc.

LSA module 204 may refer to one or more components configured, designed, and/or programmed to generate term-passage matrix data 112 based on multiple information files 108. In some embodiments, a number of rows of term-passage matrix data 112 may include a number of distinct words in multiple information files 108 and a number of distinct word pairs in multiple information files 108. In these instances, a number of columns of term-passage matrix data 112 may include a number of passages in multiple information files 108.

LSA module 204 may be configured to also generate reduced-dimensional semantic space 114 based on term-passage matrix data 112. For example, LSA module 204 may generate reduced-dimensional semantic space 114 based on term-passage matrix data 112 by decomposing term-passage matrix data 112 to generate reduced-dimensional semantic space 114 using a singular value decomposition (SVD) approach. In some embodiments, the LSA module 204 may be further configured to determine the number of distinct word pairs based on an application of an algorithm associated with the SVD approach using each value of an increasing sequence, e.g., $1, 2^2, 2^2, \ldots 2^i$, in turn, such that the algorithm produces a set of eigenvalues that includes a previous set of eigenvalues to a predetermined extent, where i is a non-zero integer. In these instances, a semantic distance of an individual word pair of the distinct word pairs may be selected based on a predetermined condition associated with computational complexity of decomposing term-passage matrix data 112.

In some embodiments, term passage matrix data 112 may initially include an m×n matrix, where m is the number of types (words) and n is the number of documents. In these instances, word pairs may be dealt with by extending the two dimensional matrix to a three dimensional matrix. This may increase computational complexity and encounter difficulties in appropriate linear algebra mechanisms in three dimensions. While extending to three dimensions, embodiments of the present disclosure may use a two dimensional matrix with an addition of word pairs to the analysis. For example, embodiments of the present disclosure may use a term-document matrix (term-passage matrix data 112) of size $(m+2^i) \times n$, where i is a nonnegative integer and the types are the set of m words plus $2^i$ commonly occurring word pairs. The challenge may become selection of an appropriate value of i. Picking a value of i that is too large may result in high computational complexity, including word pairs adding little semantic meaning. Picking the value of i that is too small may exclude many word pairs having significant values for LSA analysis.

In some embodiments, term-passage matrix data 112 may be represented by a $(m+2^i) \times n$ term-document matrix, which is denoted by $A_i$. The singular value decomposition of this matrix may be implemented using an Equation 1 shown below. If the rank of $A_i$ is $r_i$, then $U_i$ will be a $(m+2^i) \times r_i$ matrix; $\Sigma_i$ may be a $r_i \times r_i$ diagonal matrix, and $V_i$ may be an $n \times r_i$ matrix. For LSA 110, truncated matrices of rank K for a suitable value of K may be selected. The matrix $A_i$ may be decomposed into rank K matrices as represented by an equation 2 shown below. In these instances, $U_{i,k}$ may be a $(m+2^i) \times K$ matrix, $\Sigma_{i,k}$ may be a K×K diagonal matrix, and $V_i$ may be an n×K matrix. Accordingly, a SVD problem may be reduced to one of finding the k largest eigenvalues and eigenvectors of $A_i A_i^T$ (if $n > (m+2^i)$) or of $A_i^T A_i$ (if $n \leq (m+2^i)$). In these instances, the Lanczos algorithm may be applied to produce the k largest eigenvalues $\lambda_{i,1} \geq \lambda_{i,2} \geq \lambda_{i,3} \geq \ldots \geq \lambda_{i,k}$, and there is an error tolerance $\epsilon > 0$, which may be close to zero.

$$A_i = U_i \Sigma_i V_i^T \qquad \text{Equation 1}$$

$$A_i = U_{i,k} \Sigma_{i,k} V_{i,k}^T \qquad \text{Equation 2}$$

Under conventional techniques, one of the principal problems with a LSA model is that initial context induced by word orders is lost in a process of building a term-document matrix because the LSA model uses a bag-of-words approach that is invariant to word orders. Embodiments of the present disclosure at least partially cause rebuilding the initial context based on word pairs using, for example, a greedy approach. In addition, embodiments of the present disclosure extract relevant word pairs representative for the initial context, and build an extended matrix that integrates underlying dependency relations of the word pairs. In some embodiments, semantically relevant word pairs may be automatically extracted from the dependency relations of the word pairs. For example, embodiments of the present disclosure may capture a higher level of representation than that of the conventional techniques through intrinsic associations of word pairs and co-occurrence word patterns. In some embodiments, embodiments of the present disclosure may also perform deep cleaning of initial training corpora by applying a full natural language processing (NLP) pipeline while integrating at least one of the following processes: stop-words elimination, annotation of concepts with corresponding part of speech tags, lemmatization and the use of solely root forms, and parsing and co-reference resolution followed by the replacement of pronouns. In addition, embodiments of the present disclosure may partially eliminate adjectives and adverbs in a training process. For example, these adjectives and adverbs may include concepts dominantly determining emotions, and/or there may be no dependencies between the concepts.

Information retrieval module 206 may refer to one or more components configured, designed, and/or programmed to determine a pseudo object associated with a query in reduced-dimensional semantic space 114 in response to receipt of the query. Information retrieval module 206 may examine one or more similarities between the pseudo object and words in multiple information files 108 in reduced-dimensional semantic space 114. Information retrieval module 206 may also determine and retrieve a passage in multiple information files 108 based on the one or more similarities.

Summarizing module 208 may refer to one or more components configured, designed, and/or programmed to at least partially cause a summarization of multiple information files 108 using reduced-dimensional semantic space 114. For example, summarizing module 208 may extract information from multiple information files 108 that may be written about the same or similar topics.

Document comparing module 210 may refer to one or more components configured, designed, and/or programmed to at least partially cause a document comparison between a file and multiple information files 108 using reduced-dimensional semantic space 114. For example, document comparing module 210 may compare the file and one or more files of multiple information files 108 based on one or more topics extracted from the file and the one or more files.

Domain searching module 212 may refer to one or more components configured, designed, and/or programmed to at least partially cause a domain-specific search using reduced-dimensional semantic space 114. For example, the domain-specific search may include a search of a particular segment of online content, which may include shopping, automotive industries, legal information, medical information, scholarly literature, enterprises (e.g., companies, government or other organizations), travels, etc. In some embodiments, the domain-specific search may include an enterprise search that may be performed based on multiple enterprise-type sources (e.g., databases and intranets).

Figure 3:
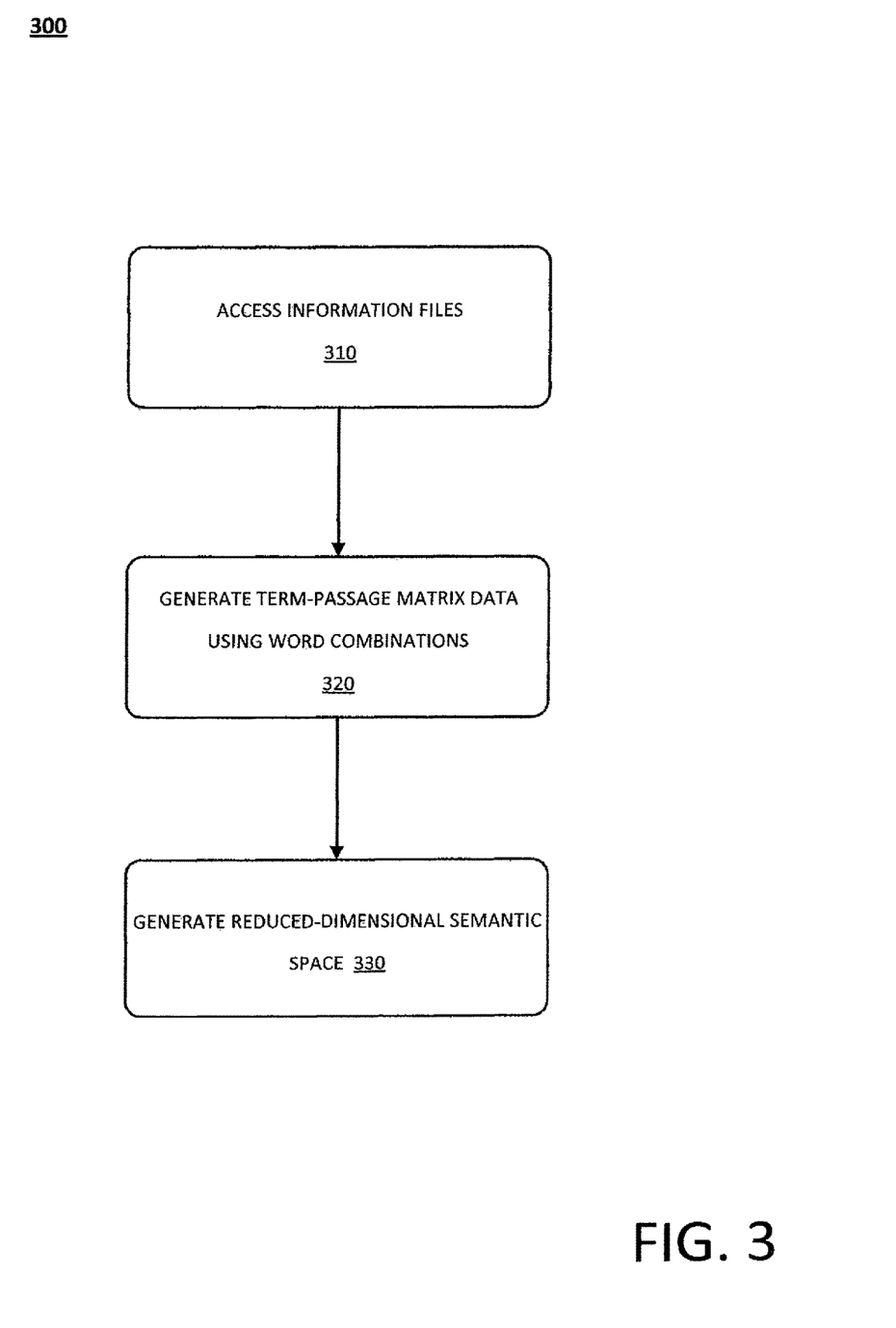
FIG. 3 shows an example processing flow with which LSA may be implemented, arranged in accordance with at least some embodiments described herein.

FIG. 3 shows an example processing flow 300 with which LSA may be implemented, arranged in accordance with at least some embodiments described herein. Processing flow 300 may be implemented by server 104 and/or device 200. Further, processing flow 300 may include one or more operations, actions, or functions depicted by one or more blocks 310, 320, and 330. Although illustrated as discrete blocks, various blocks may be divided into additional blocks, combined into fewer blocks, or eliminated, depending on the desired implementation. For illustrative purpose, process 300 is described in the context of an implementation in device 200 which functions as server 104. Processing flow 300 may begin at block 310.

Block 310 may refer to information accessing module 202 accessing multiple information files 108. For example, server 104 may access multiple information files 108 stored on information data store 106 to perform LSA 110.

Block 320 may refer to LSA module 204 generating term-passage matrix data 112 based on multiple information files 108. In some embodiments, a number of rows of term-passage matrix data 112 may include a sum of a number of distinct words in multiple information files 108 and a number of distinct word pairs in multiple information files 108. In these instances, a number of columns of term-passage matrix data 112 may include a number of passages in multiple information files 108. In some embodiments, a semantic distance of an individual word pair of the distinct word pairs may be selected based on a predetermined condition associated with computational complexity of decomposing term-passage matrix data 112. In these instances, an individual word pair of the distinct word pair may include a non-consecutive word pair.

Block 330 may refer to LSA module 204 decomposing term-passage matrix data 112 to generate reduced-dimensional semantic space 114. In some embodiments, LSA module 204 may decompose term-passage matrix data 112 using a SVD approach. In some embodiments, the number of the distinct word pairs may be determined based on an application of an algorithm associated with the SVD approach using each value of an increasing sequence, e.g., 1, $2^2, 2^2, \ldots 2^i$, in turn, such that the algorithm produces a set of eigenvalues that include a previous set of eigenvalues to a predetermined extent, and wherein i is a non-zero integer. For example, the algorithm includes a Lanczos algorithm.

In some embodiments, responsive to a query, information retrieval module 206 may determine a pseudo object associated with the query in reduced-dimensional semantic space 114, and examine one or more similarities between the pseudo object and words in multiple information files 108 in reduced-dimensional semantic space 114. In these instances, the information retrieval module 206 may also determine a passage from multiple information files 108 based on the one or more similarities.

Figure 4:
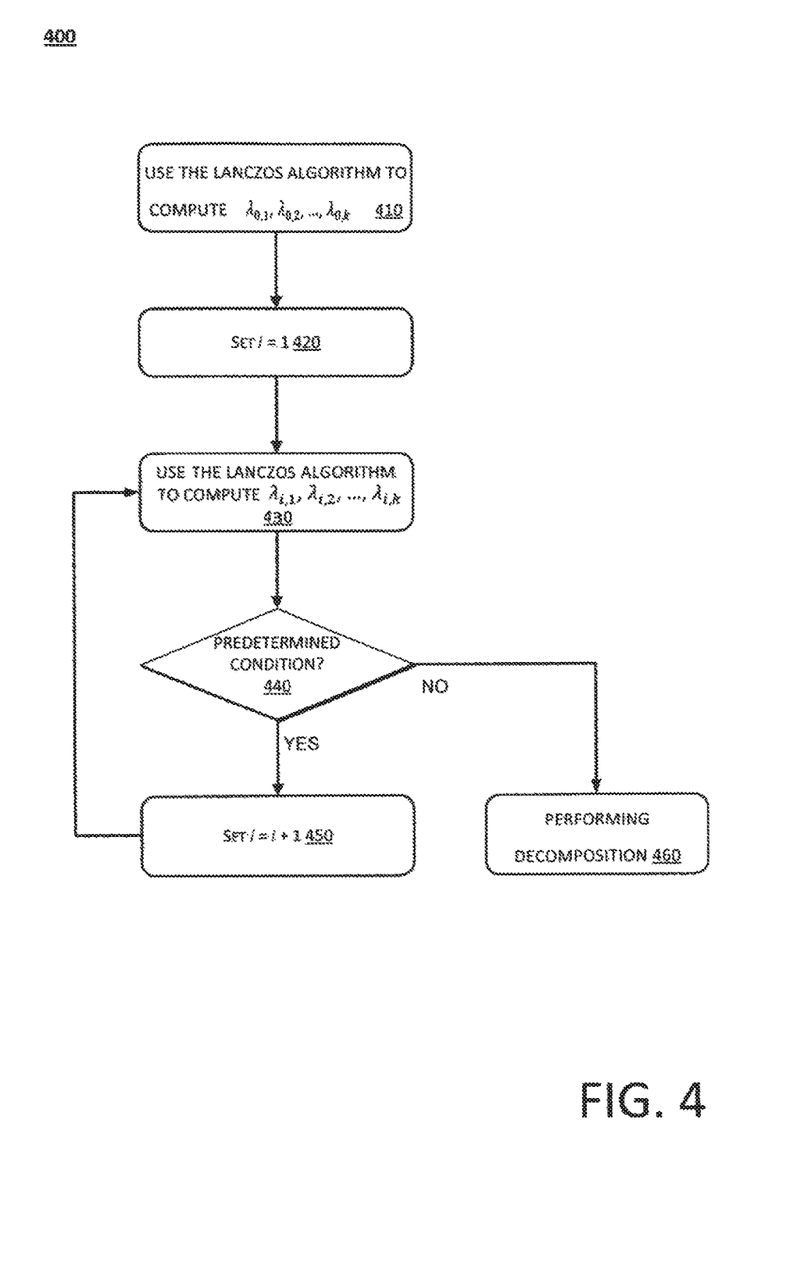
FIG. 4 shows an example processing flow with which determination of a number of word pairs for LSA may be implemented, arranged in accordance with at least some embodiments described herein.

FIG. 4 shows an example processing flow with which determination of a number of word pairs for LSA may be implemented, arranged in accordance with at least some embodiments described herein. Processing flow 400 may be implemented by server 104 and/or device 200. Further, processing flow 400 may include one or more operations, actions, or functions depicted by one or more blocks 410, 420, 430, 440, 450, and 460. Although illustrated as discrete blocks, various blocks may be divided into additional blocks, combined into fewer blocks, or eliminated, depending on the desired implementation. For illustrative purpose, process 400 is described in the context of an implementation in device 200 which functions as server 104. Processing flow 400 may begin at block 410.

Block 410 may refer to LSA module 204 using an eigenvalue algorithm and/or iterative method, e.g., the Lanczos algorithm, to compute eigenvalues ($\lambda_{0,1}, \lambda_{0,2}, \lambda_{0,3}, \ldots, \lambda_{0,k}$). As discussed above, a SVD problem may be reduced to one of finding the k largest eigenvalues and eigenvectors of $A_i A_i^T$ (if n>(m+$2^i$)) or of $A_i^T A_i$ (if n≤(m+$2^i$)). In these instances, the Lanczos algorithm may be applied to produce the k largest eigenvalues $\lambda_{i,1} \geq \lambda_{i,2} \geq \lambda_{i,3} \geq \ldots \geq \lambda_{i,k}$, and there is an error tolerance $\epsilon > 0$, which may be close to zero.

Block 420 may refer to LSA module 204 setting i=1.

Block 430 may refer to LSA module 204 using the Lanczos algorithm to compute eigenvalues ($\lambda_{i,1}, \lambda_{i,2}, \lambda_{i,3} \ldots, \lambda_{i,k}$).

Block 440 may refer to LSA module 204 determining whether a predetermination condition (e.g., $\lambda_{i-1,2}(1-\epsilon) \geq \lambda_{i,j} \geq \lambda_{i-1,k}(1+\epsilon)$) is satisfied if ∀j with 1≤j≤k.

If $\lambda_{i-1,2}(1-\epsilon) \geq \lambda_{i,j} \geq \lambda_{i-1,k}(1+\epsilon)$ ("YES" branch of block 440, process 400 proceeds to 450 and LSA module 204 may set i=i+1 and the blocks 430 to 450 may be performed by a loop process (via dashed line from the blocks 450 to 430). If $\lambda_{i-1,2}(1-\epsilon) < \lambda_{i,j} < \lambda_{i-1,k}(1+\epsilon)$ ("NO" branch of block 440), process 400 proceeds to 460 and LSA module 204 may use (m+$2^i$) as the number of the word pairs for LSA 110, and may determine that the decomposition $A_i = U_{i,k} \Sigma_{i,k} V_{i,k}^T$ is sufficient.

Figure 5:
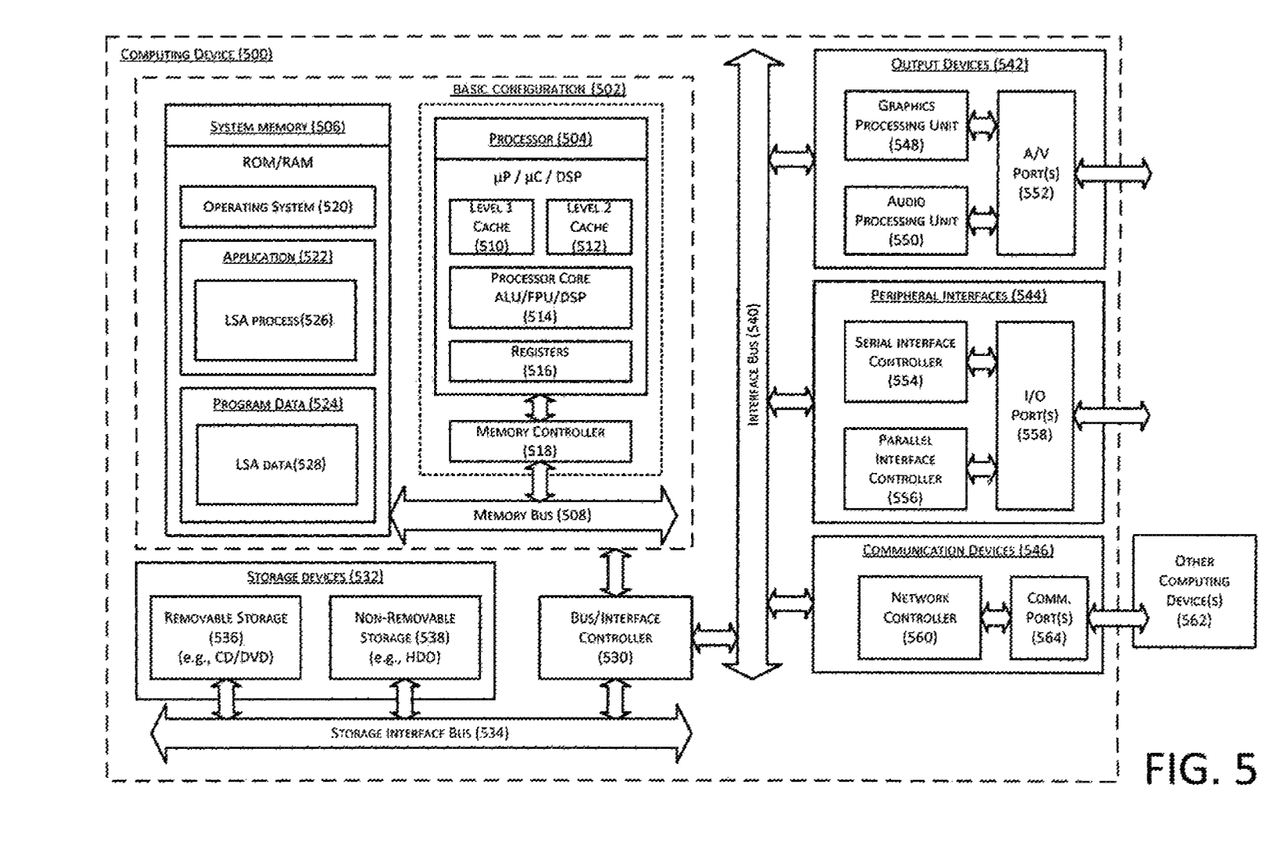
FIG. 5 shows a block diagram illustrating an example computing device by which various example solutions described herein may be implemented, arranged in accordance with at least some embodiments described herein.

FIG. 5 shows a block diagram illustrating an example computing device 500 by which various example solutions described herein may be implemented, arranged in accordance with at least some embodiments described herein.

In a very basic configuration 502, computing device 500 typically includes one or more processors 504 and a system memory 506. A memory bus 508 may be used for communicating between processor 504 and system memory 506.

Depending on the desired configuration, processor 504 may be of any type including but not limited to a microprocessor (µP), a microcontroller (µC), a digital signal processor (DSP), or any combination thereof. Processor 504 may include one or more levels of caching, such as a level one cache 510 and a level two cache 512, a processor core 514, and registers 516. An example processor core 514 may include an arithmetic logic unit (ALU), a floating point unit (FPU), a digital signal processing core (DSP Core), or any combination thereof. An example memory controller 518 may also be used with processor 504, or in some implementations, memory controller 518 may be an internal part of processor 504.

Depending on the desired configuration, system memory 506 may be of any type including but not limited to volatile memory (such as RAM), non-volatile memory (such as ROM, flash memory, etc.) or any combination thereof. System memory 506 may include an operating system 520, one or more applications 522, and program data 524. Application 522 may include a LSA process 526 (e.g., LSA 110) that is arranged to perform the functions as described herein including those described with respect to processing flow 300 of FIG. 3 and/or processing flow 400 of FIG. 4 (e.g., by server 104). Program data 524 may include LSA data 528 that may be useful for operation with LSA 110 as described herein. In some embodiments, application 522 may be arranged to operate with program data 524 on operating system 520 such that implementations of information transfer using an encryption key that can be used to encrypt messages may be provided as described herein. This described basic configuration 502 is illustrated in FIG. 5 by those components within the inner dashed line.

Computing device 500 may have additional features or functionality, and additional interfaces to facilitate communications between basic configuration 502 and any required devices and interfaces. For example, a bus/interface controller 530 may be used to facilitate communications between basic configuration 502 and one or more data storage devices 532 via a storage interface bus 534. Data storage devices 532 may be removable storage devices 536, non-removable storage devices 538, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 506, removable storage devices 536 and non-removable storage devices 538 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

Computing device 500 may also include an interface bus 540 for facilitating communication from various interface devices (e.g., output devices 542, peripheral interfaces 544, and communication devices 546) to basic configuration 502 via bus/interface controller 530. Example output devices 542 include a graphics processing unit 548 and an audio processing unit 550, which may be configured to communicate to various external devices such as a display or speakers via one or more A/V ports 552. Example peripheral interfaces 544 include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 546 includes a network controller 560, which may be arranged to facilitate communications with one or more other computing devices 562 over a network communication link via one or more communication ports 564.

The network communication link may be one example of a communication media. Communication media may typically be embodied by computer readable instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 500 may be implemented as a portion of a small-form factor portable (or mobile) electronic device such as a cell phone, a smartphone, a personal data assistant (PDA), a personal media player device, a wireless web-watch device, a personal headset device, an application specific device, or a hybrid device that include any of the above functions. Computing device 500 may also be implemented as a server or a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein may be implemented, e.g., hardware, software, and/or firmware, and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes for device configuration via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, e.g., as one or more programs running on one or more computer systems, as one or more programs running on one or more processors, e.g., as one or more programs running on one or more microprocessors, as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a compact disk (CD), a digital versatile disk (DVD), a digital tape, a computer memory, etc.; and a transmission type medium such as a digital and/or an analog communication medium, e.g., a fiber optic cable, a waveguide, a wired communication link, a wireless communication link, etc.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors, e.g., feedback for sensing position and/or velocity; control motors for moving and/or adjusting components and/or quantities. A typical data processing system may be implemented utilizing any suitable commercially available components, such as those typically found in data computing/communication and/or network computing/communication systems.

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Lastly, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general, such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general, such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A method, comprising:
accessing, by one or more processors, a plurality of information files;
generating, by the one or more processors, term-passage matrix data based on the plurality of information files;
decomposing the term-passage matrix data to generate a reduced-dimensional semantic space,
wherein a number of rows of the term-passage matrix data corresponds to a sum of a number of distinct words in the plurality of information files and a number of distinct word pairs in the plurality of information files,
wherein a number of columns of the term-passage matrix data corresponds to a number of passages in the plurality of information files, and
wherein the term-passage matrix data indicates a frequency of occurrence of each individual word of the distinct words in the plurality of information files and a frequency of occurrence of each individual word pair of the distinct word pairs in the plurality of information files;
responsive to a query, determining a pseudo object associated with the query in the reduced-dimensional semantic space;
examining one or more similarities between the pseudo object and words in the plurality of information files in the reduced-dimensional semantic space; and
determining a passage from the plurality of information files based on the one or more similarities.

2. The method of claim 1, wherein a semantic distance of an individual word pair of the distinct word pairs is selected based on a particular condition associated with computational complexity of decomposition of the term-passage matrix data.

3. The method of claim 1, wherein an individual word pair of the distinct word pairs is a non-consecutive word pair.

4. The method of claim 1, wherein the decomposing comprises decomposing using a singular value decomposition (SVD) approach.

5. The method of claim 4, further comprising:
determining the number of the distinct word pairs based on an application of an algorithm associated with the SVD approach using each value of 1, $2^1$, $2^2$, ... $2^i$ in turn such that the algorithm produces a set of eigenvalues that comprises a previous set of eigenvalues to a particular extent, wherein i is a non-zero integer.

6. The method of claim 5, wherein the algorithm comprises an algorithm associated with an iterative method or an eigenvalue algorithm.

7. A non-transitory computer-readable storage medium having stored thereon computer-executable instructions executable by one or more processors to perform operations comprising:
generating term-passage matrix data to represent a plurality of information files, wherein the term-passage matrix data indicates a frequency of occurrence of each individual word of a plurality of distinct words in the plurality of information files and further indicates a frequency of occurrence of each individual word combination of a plurality of distinct word combinations in the plurality of information files;
decomposing the term-passage matrix data to generate a reduced-dimensional semantic space;
in response to a query, determining a pseudo object associated with the query in the reduced-dimensional semantic space;
examining one or more similarities between the pseudo object and words in the plurality of the information files in the reduced-dimensional semantic space; and
determining a passage from the plurality of information files based on the one or more similarities.

8. The non-transitory computer-readable storage medium of claim 7, wherein a number of rows of the term-passage matrix data corresponds to a sum of a number of the plurality distinct words in the plurality of information files and a number of the plurality of distinct word combinations in the plurality of information files, and wherein a number of columns of the term-passage matrix data corresponds to a number of passages in the plurality of information files.

9. The non-transitory computer-readable storage medium of claim 7, wherein the plurality of distinct word combinations comprises a plurality of distinct word pairs.

10. The non-transitory computer-readable storage medium of claim 7, further comprising:
responsive to the query, translating the query into a vector representation using the reduced-dimensional semantic space; and
comparing the vector representation of the query and vector representation of one or more passages in the plurality of information files in the reduced-dimensional semantic space.

11. The non-transitory computer-readable storage medium of claim 7, further comprising at least partially causing at least one of: a summarization of the plurality of information files using the reduced-dimensional semantic space, a document comparison between a file and the plurality of information files using the reduced-dimensional semantic space, or a domain specific search using the reduced-dimensional semantic space.

12. An apparatus, comprising:
one or more processors; and
a memory configured to store a plurality of components executable by the one or more processors, the plurality of components comprising:
an information accessing module configured to access a plurality of information files;
a latent semantic analysis (LSA) module configured to:
generate term-passage matrix data based on the plurality of information files, wherein a number of rows of the term-passage matrix data corresponds to a sum of a number of distinct words in the plurality of information files and a number of distinct word pairs in the plurality of information files, wherein a number of columns of the term-passage matrix data corresponds to a number of passages in the plurality of information files, and wherein the term-passage matrix data indicates a frequency of occurrence of each individual word of the distinct words in the plurality of information files and a frequency of occurrence of each individual word pair of the distinct word pairs in the plurality of information files; and
generate a reduced-dimensional semantic space based on the term-passage matrix data; and
an information retrieval module configured to:
responsive to a query, determine a pseudo object associated with the query in the reduced-dimensional semantic space;

examine one or more similarities between the pseudo object and words in the plurality of information files in the reduced-dimensional semantic space; and
determine a passage in the plurality of information files based on the one or more similarities.

13. The apparatus of claim 12, wherein the LSA module is further configured to generate the reduced-dimensional semantic space based on the term-passage matrix data by decomposition of the term-passage matrix data to generate the reduced-dimensional semantic space by use of a singular value decomposition (SVD) approach.

14. The apparatus of claim 13, wherein the LSA module is further configured to determine the number of distinct word pairs based on an application of an algorithm associated with the SVD approach by use of each value of 1, $2^1$, $2^2$, ... $2^i$ in turn such that the algorithm produces a set of eigenvalues that comprises a previous set of eigenvalues to a particular extent, and wherein i is a non-zero integer.

15. The apparatus of claim 12, wherein a semantic distance of an individual word pair of the distinct word pairs is selected based on a particular condition associated with computational complexity of decomposition of the term-passage matrix data.

16. The apparatus of claim 12, wherein the plurality of components further comprises at least one of: a summarizing module configured to at least partially cause a summarization of the plurality of information files by use of the reduced-dimensional semantic space, a document comparing module configured to at least partially cause a document comparison between a file and the plurality of information files by use of the reduced-dimensional semantic space, or a domain searching module configured to at least partially cause a domain specific search by use of the reduced-dimensional semantic space.

* * * * *

UNITED STATES PATENT AND TRADEMARK OFFICE
CERTIFICATE OF CORRECTION

PATENT NO. : 9,734,144 B2  
APPLICATION NO. : 14/891810  
DATED : August 15, 2017  
INVENTOR(S) : Dascalu et al.

Page 1 of 1

It is certified that error appears in the above-identified patent and that said Letters Patent is hereby corrected as shown below:

In the Specification

In Column 3, Line 23, delete "1, $2_1$," and insert -- 1, $2^1$, --, therefor.

In Column 5, Line 45, delete "1, $2^2$," and insert -- 1, $2^1$, --, therefor.

In Column 8, Line 4, delete "$2^2$ , $2^2$," and insert -- $2^1$, $2^2$, --, therefor.

In the Claims

In Column 14, Lines 11-12, in Claim 8, delete "plurality distinct" and insert -- plurality of distinct --, therefor.

Signed and Sealed this  
Twelfth Day of December, 2017

Joseph Matal  
*Performing the Functions and Duties of the*  
*Under Secretary of Commerce for Intellectual Property and*  
*Director of the United States Patent and Trademark Office*